United States Patent [19]

Padget et al.

[11] Patent Number: 4,806,590

[45] Date of Patent: Feb. 21, 1989

[54] AQUEOUS-BASED SEALANT COMPOSITIONS

[75] Inventors: John C. Padget, Frodsham; Donald H. McIlrath, Liverpool, both of England

[73] Assignee: Imperial Chemical Industries PLC, London, England

[21] Appl. No.: 52,002

[22] Filed: May 20, 1987

[30] Foreign Application Priority Data

May 27, 1986 [GB] United Kingdom ................ 8612776
Jul. 2, 1986 [GB] United Kingdom ................ 8616187

[51] Int. Cl.[4] .............................................. C08J 27/00
[52] U.S. Cl. .................................... 524/568; 524/297; 524/425; 526/343
[58] Field of Search ............... 524/568, 297, 425; 526/343

[56] References Cited

U.S. PATENT DOCUMENTS

| 4,006,113 | 2/1977 | Furukawa | 524/445 |
| 4,341,679 | 7/1982 | Burgess et al. | 524/833 |
| 4,543,386 | 9/1985 | Padget et al. | 524/523 |
| 4,543,387 | 9/1985 | Padget et al. | 524/523 |
| 4,544,699 | 10/1985 | Biale | 524/568 |
| 4,627,993 | 12/1986 | Loomis | 524/297 |

OTHER PUBLICATIONS

Boenig "Structure and Properties of Polymers", 8/4/77 pp. 256–260.

Primary Examiner—Joseph L. Schofer
Assistant Examiner—Peter D. Mulcahy
Attorney, Agent, or Firm—Cushman, Darby & Cushman

[57] ABSTRACT

Aqueous-based sealant composition comprising at least one vinylidene chloride copolymer which has modal molecular weight Mp of at least 200,000, wherein the composition has Tg below 0° C. The vinylidene chloride copolymer preferably includes polymerized units of an internally plasticizing comonomer and an unsaturated carboxylic acid. The composition preferably includes an external plasticizer and a filler material (particularly untreated calcium carbonate).

30 Claims, No Drawings

AQUEOUS-BASED SEALANT COMPOSITIONS

The present invention relates to aqueous-based sealant compositions.

The increased use of aqueous-based sealant compositions in recent years has followed the expanding market for aqueous-based coatings such as latex paints. (By an aqueous-based sealant composition is meant a composition in which the seal-forming material(s) and other components of the composition are dispersed in a totally or predominantly aqueous medium). Such aqueous-based compositions provide sealants which are more compatible with coatings from water-based products in comparison to sealants from oil and solvent-based compositions, allowing good mutual coating/sealant adhesion and eliminating the problem of bleed-through from an oil-based sealant into a subsequently applied coating. Additionally, aqueous-based sealant compositions are advantageous in their own right (and do not of course have to be used in conjunction with water-based coatings) in that they avoid the toxicity, flammability, and pollution problems associated with solvent-based products in general (the solvents employed usually being dangerous or harmful organic liquids).

There are three main types of aqueous-based sealant compositions in current use, each type deriving from a particular type of polymeric material in aqueous latex form used for the preparation of the composition, this polymeric material being the active constituent (the "binder") of the sealant composition. These are:

acrylic aqueous-based sealant compositions, wherein the binder material is an all-acrylic polymer (typically from the (co) polymerisation of alkyl acrylates and/or alkyl methacrylates); these yield high perfermance sealants (comparable to the various types of premium-priced chemically- or moisture-cured true elastomeric sealants) but are the most expensive of the aqueous-based sealant compositions;

vinyl/acrylic aqueous-based sealant compositions, wherein the binder material is a copolymer of an acrylic monomer (e.g. an alkyl acrylate or methacrylate) and vinyl acetate (sometimes vinyl chloride); these are lower in cost than and inferior in performance to the all-acrylic-based materials, although they are still useful for many applications;

polyvinyl acetate aqueous-based sealant compositions wherein the binder material is polyvinyl acetate; these are the cheapest of the aqueous-based sealant compositions and have the poorest performance, although nevertheless being satisfactory for various indoor applications.

While a fairly high degree of sophistication has already been attained with regard to the market for aqueous-based sealant compositions (as described above), the search for new and potentially superior types of such compositions nevertheless continues.

We have now discovered a class of aqueous-based sealant compositions based on certain vinylidene chloride polymers which provide sealants having properties comparable to, and in some respects distinctly superior to, the high performance acrylic-based aqueous-based sealants described above. Moreover, these compositions possess better fire retardancy and barrier properties than the all-acrylic types described above. (It should be noted here that the term "sealant" as used herein is intended to embrace materials such as mastics, caulks, roofing mastics, as well as more generally applicable sealants).

According to the present invention there is provided an aqueous-based sealant composition comprising at least one vinylidene chloride copolymer which copolymer comprises polymerised units of vinylidene chloride and has a modal molecular weight Mp (as herein defined) of at least 200,000, and wherein said aqueous-based sealant composition (after drying) has a Tg below 0° C.

The at least one vinylidene chloride copolymer used in the aqueous-based sealant composition is normally prepared by polymerisation in aqueous emulsion and the copolymer latex so formed is used (optionally in combination with one or more other such vinylidene chloride copolymers as defined above optionally also in latex form) to provide the basis of the aqueous-based sealant composition.

Preferably, said at least one vinylidene chloride copolymer itself has a Tg$\leq$10° C. (more preferably −40°0 to 10° C. and particularly −40° to 0° C.).

The aqueous-based sealant compositions of the invention provide sealants which have an exceptionally advantageous combination of desirable properties, particularly in respect of mechanical properties such as maximum stress, breaking strain, and modulus, and of adhesion and cohesion in tension properties, which properties are fully comparable to, and in some respects superior to, those of the high performance all-acrylic aqueous-derived sealants described above.

In this specification, modal molecular weight Mp is defined as the molecular weight at the peak maximum of the molecular weight distribution curve obtained using a gel permeation chromatograph packed with beads of divinyl benzene gel and calibrated with polystyrene samples of known molecular weight and narrow molecular weight distribution (Weight Average Molecular Weight Mw/Number Average Molecular Weight $M_n$=1.05 to 1.07) to give a linear calibration between polystyrene molecular weights of 1000 and $3.6 \times 10^6$. The vinylidene chloride copolymer and polystyrene samples for gel permeation chromatography are used as solutions of 0.02 g polymer in 10 ml of H.P.L.C. grade tetrahydrofuran.

It is to be understood that the value of Mp used herein is the measurement obtained using only substantially gel-free copolymer. A vinylidene chloride copolymer (as defined) for use in the composition of the invention may, if desired (although usually it is not preferred to any substantial degree), have a degree of cross-linking that has been produced during the polymerisation; this may result in a proportion of gel which, in a sample to be used for the estimation of Mp, is removed by filtration of the tetrahydrofuran solution to be injected into the gel permeation chromotograph before the measurement of Mp.

The at least one vinylidene chloride copolymer of the composition of the invention should have Mp of at least 200,000 since it has been found that it is copolymers of such Mp which give rise to the advantageous combination of sealant properties. The upper limit for Mp is not critical in itself although copoylmers of Mp above $5 \times 10^6$ are very difficult to prepare. Consequently Mp for the vinylidene chloride copolymer(s) used in the present invention will usually lie within the range of from 200,000 to $5 \times 10^6$. Additionally, while the advantageous sealant properties do in general improve slowly with increasing Mp above 200,000, very little such improvement is found for such copolymers with Mp above 600,000 (in comparison to those with Mp within the range of 200,000 to 600,000). Hence Mp for the vinylidene copolymer(s) of the invention will more usually lie within the range of from 200,000 to 600,000.

By Tg herein is meant the glass transition temperature (measured by differential scanning calorimetry).

The aqueous-based sealant composition of the present invention (after removal of water) should have a Tg of below 0° C. This may be achieved either by employing vinylidene chloride copolymer(s) of Tg below 0° C. by means of incorporating polymerised units of at least one internally plasticising comonomer in the copolymer, or by including at least one external plasticiser in the composition, or by a combination of both expedients (i.e. by the use of internally plasticising comonomer, which does not necessarily of itself (but can) provide a copolymer of Tg of below 0° C., and external plasticiser which does not necessarily of itself (but can) provide a copolymer of Tg of below 0° C., and external plasticiser which does not necessarily of Generally speaking, it is preferred that the composition of the invention does not include vinylidene chloride copolymer(s) having polymerised units therein of at least one laterally plasticising comonomer, (irrespective of whether an external plasticiser(s) is employed or not). Similarly, it is preferred that the composition does include at least one external plasticiser (irrespective of whether vinylidene chloride copolymer(s), having therein polymerised units of at least one internally plasticising comonomer and usually but not necessarily Tg below 0° C., is employed or not). Preferably the Tg of the composition is within the range of from −75° to <0° C. More preferably, the Tg of the composition lies within the range of from −75° to −30° C., and particularly of from -70 to -40° C.

External plasticisers which may (optionally) be employed in the compositions of the invention include esters of polycarboxylic acids such as phthalic acid, isophthalic acid, terephthalic acid, adipic acid, azalaic acid, sebacic acid, and mellitic acid. Phosphoric acid esters, such as trioctyl phosphate, tricresyl phosphate, tritolyl phosphate and trixylyl phosphate, and polyester plasticisers such as polypropylene laurate, soya bean oil derived plasticisers such as epoxidised soya bean oil, and chlorinated paraffins may also be used. Particularly suitable plasticisers include the C2-C14 alkyl esters of dicarboxylic acids, examples of which include dibutyl phthalate, dihexyl phthalate, dioctyl phthalate, di-isooctyl phthalate, dinonyl phthalate, a mixture of C7-9 dialkyl phthalates, ditridecyl phthalate, butyl benzyl phthalate, dibutyl adipate, dihexyl adipate, doctyl adipate, di-iso-octyl adipate, dibutyl sebacate and dioctyl sebacate. The phthalic acid esters are generally the most preferred. The at least one external plasticiser will normally be present in the composition in an amount of 0 to 150 weight % (preferably 0 to 75 weight %) based on the weight of said at least one vinylidene chloride copolymer. If used, the amount of external plasticiser(s) will usually be 1 to 150 weight % (preferably 1 to 75 weight %, more preferably 20 to 75 weight %) based on the weight of said at least one vinylidene chloride copolymer.

The amount of polymerised vinylidene chloride units in the at least one vinylidene chloride copolymer used in the composition of the invention is usually 10 to 90 weight %, more usually 15 to 85 weight %, and very often 15 to 70 weight %. A common range is 15 to 65 weight %. The amount of said at least one vinylidene chloride copolymer in the composition is usually in the range of from 10 to 50 weight % (dry weight of copolymer, total weight of composition i.e. including water), more usually 15 to 30 weight %, with about 15 to 25 weight % being typical.

The amount of polymerised units of at least one internally plasticising comonomer in the vinylidene copolymer(s) used for the invention is normally in the range of from 0 to 90 weight % (more preferably 0 to 85 weight %), and where present is normally in the range of 10 to 90 weight % (more preferably 15 to 85 weight % and particularly 30 to 85 weight %). Particularly preferred vinylidene copolymer(s) for use in the invention comprises 15 to 70 weight % of polymerised units of vinylidene chloride and 30 to 85 weight % of polymerised units of said at least one internally plasticising comonomer.

By "an internally plasticising comonomer" is meant a comonomer which gives a homopolymer (when polymerised alone) of very low Tg, preferably $\leq -20°$ C., more preferably $\leq -40°$ C., and so provides copolymerised units in a copolymer which (if present in sufficient proportion) tend to cause the copolymer to be intrinsically plasticised and thereby have considerably lowered Tg in comparison to a polymer not having such units. Thus the use of such comonomers allows various desired values of Tg to be readily achieved. Suitable plasticising comonomers include certain kinds of alkyl and alkoxyalkyl acrylates and methacrylates such as n-butyl acrylate, 2-ethylhexyl acrylate, n-decyl methacrylate, n-octyl acrylate, 2-ethylbutyl acrylate, n-heptyl acrylate, 2-heptyl acrylate, n-hexyl acrylate, 3-methylbutyl acrylate, n-nonyl acrylate, 2-octyl acrylate, n-propyl acrylate, 1-ethoxyethyl acrylate, 1-ethoxypropyl acrylate, 2-methoxyethyl acrylate, 3-methoxypropyl acrylate and propoxylated acrylates and methacrylates, and other monomers such as ethylene, 1,3- butadiene, isoprene, chloroprene, 1-decene, 1-pentene, 1-octene, and nuclear substituted styrenes such as 4-dodecyl styrene, 4-nonyl styrene and the 4-alkylsulphonyl styrene. Of these, n-butyl acrylate and 2-ethylhexyl acrylate are usually preferred with n-butyl acrylate being particularly preferred. The proportion of polymerised units of the at least one internally plasticising comonomer in the abovementioned preferred vinylidene chloride copolymers is more preferably 40 to 80 weight %.

Particularly preferred vinylidene chloride copolymers for use in the invention are those which comprise units of at least one alkyl acrylate or methacrylate having 1 to 12 (preferably 2 to 10 and more preferably 2 to 8) carbon atoms in the alkyl groups. As can be surmised from the examples of plasticising comonomers listed above, the said at least one alkyl acrylate or methacrylate of 1 to 12 carbon atoms in the alkyl groups can optionally provide at least part of the units of internally plasticising comonomer(s) in the copolymer (if used). One particularly preferred alkyl acrylate is n-butyl acrylate (an internally plasticising comonomer), and the vinylidene chloride copolymer used in the invention may comprise this comonomer as the sole (meth)acrylate and plasticising comonomer therein, (although, of course, the n-butyl acrylate could also be used in combination with one or more other alkyl (meth)acrylates as defined above). Examples of other alkyl (meth)acrylates which may be used are ethyl acrylate (not internally plasticising) and 2-ethylhexyl acrylate (internally plasticising).

The amount of such polymerised (meth)acrylate units (if used) in the vinylidene chloride copolymer used in the invention is usually within the range 10 to 90 weight %, and is preferably 15 to 85 weight %, more preferably 30 to 85 weight %.

Accordingly further preferred vinylidene chloride copolymers for use in the invention comprise 15 to 70 weight % of polymerised units of vinylidene chloride, 30 to 85 weight % of polymerised units of at least one internally plasticising comonomer, and 30 to 85 weight % of polymerised units of at least one alkyl acrylate or methacrylate having 1 to 12 carbon atoms in the alkyl groups and optionally providing at least part of the units of said internally plasticising comonomer. (The total weight % of all polymerised units must of course equal 100 weight %.)

The vinylidene chloride copolymer of for use in the invention may optionally comprise polymerised units (usually in an amount of up to 20% by weight, i.e. the copolymer may comprise 0 to 20% by weight thereof) of other copolymerisable comonomers, such as vinyl chloride, alkyl acrylates and methacrylates having 13 to 18 carbon atoms in the alkyl group, alkoxyalkyl acrylates and methacrylates having 1 to 18 carbon atoms in the alkyl groups, styrene, acrylonitrile, vinyl acetate, vinyl ethyl ether, ethylene, cis and trans 1,3-butadiene, cis and trans isoprene, cis and trans chloroprene, 1-decene, 1-[entene and 1-octene; in particular it may optionally comprise polymerised units of at least one copolymerisable ethylenically unsaturated acid (usually in an amount of up to 20% by weight, i.e. the copolymer may comprise 0 to 20% by weight of such units and more usually 0.1 to 15% by weight if present; typical ranges are 1 to 10% by weight and 1 to 5% by weight). The inclusion of such acid units is in fact preferred since the resulting sealant composition then has further improved properties (usually better adhesion and mechanical properties). The ommission of such acid units in fact tends to yield (after removal of water) a rather weaker sealant, although generally having greater extensibility (which would be useful for some applications).

The vinylidene chloride polymer used in the invention may be amorphous or partially crystalline although it is more usually amorphous (with less than 5% and more usually substantially zero crystallinity), being non-crystalline in the laxet and not crystallising on or after seal formation.

As mentioned above, the vinylidene chloride copolymer used in the composition of the present invention may optionally contain polymerised units of at least one multi-functional comonomer that has effected, when present, a partial (in the sense of a degree of cross-linking during the polymerisation (resulting in the formation of some insoluble gel), as this can sometimes improve the performance of the composition. Multi-functional comonomers providing this type of cross-linking are polyunsaturated monomers examples of which include allyl methacrylate, diallyl maleate, diallyl phthalate and divinyl benzene.

Thus units of such multi-functional comonomers can be present in an amount usually in the range of up to 10 weight %, i.e. the copolymer may comprise 0 to 10 weight % of such units (or more usually if present 0.01 to 10 weight %, preferably 0.01 to 5 weight %). Nevertheless, as mentioned before, even though such cross-linking also increases molecular weight, it is not usually preferred that a copolymer according to the invention contains such polymerised units to any great degree; this is because the partial cross-linking effected during polymerisation might adversely effect the properties of the composition and, although a small degree of cross-linking can be employed if desired, a high degree of cross-linking is not recommended as a general rule.

Besides optionally including polymerised units of at least one multi-functional comonomer which causes cross-linking during polymerisation, the vinylidene chloride copolymer used in the invention may also optionally possess polymerised units of at least one comonomer which provides a latent cross-linking functionality; a latent cross-linking functionality is one where the functional group or groups of the comonomer cause cross-linking not during (or not only during) polymerisation but subsequent to polymerisation (e.g. during, on, or after evaporation of water). (For the sake of clarity, it is to be understood that the definition of Mp for the vinylidene chloride copolymer used in the composition of the invention applies to the copolymer before any optional latent cross-linking that may take place subsequent to polymerisation.) The latent cross-linking functionality can be one which is activated by the presence in the composition of a cross-linking agent (e.g. a divalent metal ion such as zinc) or can be one which is activated without the requirement for a cross-linking agent e.g. spontaneously at ambient temperature on ageing or by electron beam radiation. Examples of comonomers having a latent type of cross-linking functionality where latent cross-linking is possible either at ambient temperature on ageing, or by heating, or by virtue of an externally added cross-linking agent or by more than one of these possibilities, have functional groups capable of cross-linking by various mechanisms including self cross-linking or mutual cross-linking by different functional groups, both in the polymer chain; examples of comonomers providing this type of cross-linking functionality include comonomers having reactive polar groups such as hydroxyl, thiol, amino, amide, isocyanate, nitrile, carboxy, and epoxide groups. Examples of such comonomers include glycidyl methacrylate and acrylate, methylaminoethyl methacrylate and acrylate, t-butylaminoethyl methacrylate and acrylate, methacrylamide, 4-pentanoguanamine, hydroxylalkyl esters such as hydroxypropyl methacrylate, hydroxyethyl methacrylate and hydroxyethyl acrylate, methacrylonitrile, N-alkoxyalkyl amides such as methoxymethyl methacrylamide and butoxy-methyl acrylamide, and hydroxyalkyl amides such as N-methylol methacrylamide and N-methylol acrylamide, and dicarboxylic acids such as maleic acid. The at least one monomer to provide a latent cross-linking functionality is usually used in an amount to provide 0 to 10 weight % and, if present, usually 0.01 to 10 weight % of polymerised units in the vinylidene chloride copolymer.

In the vinylidene chloride copolymer used in the invention the at least one ethylenically unsaturated copolymerisable acid, if used (as is preferred), is preferably an ethylenically unsaturated carboxylic acid. Particularly preferred acids are aliphatic alpha, beta-unsaturated carboxylic acids such as acrylic acid, methacrylic acid, itaconic acid, citraconic acid and beta-carboxy ethyl acrylate. It may be mentioned that the at least one ethylenically unsaturated carboxylic acid can also provide units which impart a latent cross-linking functionality as discussed above if the composition includes a cross-linking agent.

The polymerisation to form the vinylidene chloride copolymer used in the invention may be carried out by known polymerisation techniques and usually by an aqueous emulsion polymerisation process; for example, copolymerisation in an aqueous medium with the aid of a free-radical-yielding initiator and usually in the presence of a surface active agent and preferably (as will next be discussed) using a 'monomer-flooding' polymerisation technique, or alternatively (but less preferably) a low polymerisation temperature, or a combination of the two methods, to achieve molecular weight Mp of at least 200,000.

A modal molecular weight Mp of at least 200,000 for the at least one vinylidene chloride copolymer used in the composition of the invention may be achieved by appropriate adjustment of the polymerisation process to produce polymer of higher than usual molecular weight. For example, molecular weight can be increased by decreasing the polymerisation temperature; however a decrease in temperature below about 40° C. may not be commercially attractive because heat transfer becomes difficult, with the result that long polymerisation reaction times and/or very low cooling water temperatures are required.

One effective method of increasing molecular weight to enable a modal molecular weight Mp of at least 200,000 to be attained at the usual commercially attractive polymerisation temperature (e.g. 40° to 70° C.) entails performing the polymerisation in such a way that the polymerisation is 'monomer-flooded' for at least a substantial part, say at least 20%, of the polymerisation. By the term 'monomer-flooded' is meant that at any given instant during which the polymerisation is in this state then there is a significant proportion of free, unpolymerised monomeric material present in the reaction medium (say more than 5% by weight based on the weight of polymer plus monomer in the reaction medium at that instant). Preferably the polymerisation is monomer-flooded for, say, at least 40% of the polymerisation.

By contrast, vinylidene chloride-based copolymerisations are often performed under monomer-starved conditions for most of the polymerisation (i.e. the polymerisation is not monomer-flooded for most (say more than 80%) of the polymerisation) in order to obtain a homogeneous copolymer or in order to minimise reaction pressure. A typical procedure would be to add 5 to 20% by weight, based on total monomeric material to be polymerised, of an initial monomer mixture to the reaction vessel and to react these monomers to a high degree of conversion (say to at least 95% conversion), and to then feed the remaining monomers at a rate such that the free monomer concentration in the reaction medium does not rise during this stage of the polymerisation. Often, the initially introduced monomers are reacted to a very high conversion to form what is referred to as a seed latex. Such monomer-starved vinylidene chloride-based copolymerisations when used in an attempt to produce copolymers for use according to the invention do not generally yield molecular weights of 200,000 or above at reaction temperatures of 40° C. or above.

The proportion of free monomer present at any moment of time during polymerisation can be determined by sampling the polymerisation vessel, e.g. by using a pressure-tight sample bomb, and analysing for free unpolymerised monomer by gas-liquid chromatography. In practice a fair simple method to determine whether a polymerisation is monomer-flooded or monomer-starved at any stage of the polymerization is to allow the polymerisation to proceed as before but to introduce no additional monomer. If the polymerisation is monomer-starved the polymerisation reaction will die away quite quickly (e.g. within 2-10 minutes). On the other hand, if the polymerisation is monomer-flooded the reaction will continue unaffected over this time scale.

There are various ways of ensuring that the polymerisation is monomer-flooded for a substantial proportion of the polymerisation, e.g.:

(A) Addition of more than, say, 20% (by weight) of the monomers to be polymerised, but less than the total amount to be polymerised, to the reaction vessel before the start of polymerisation and commencement of monomer feeding before the initial monomer mixture has reacted to a high degree of conversion. It is desirable in this variant to feed the remainder of the monomeric material at such a rate that the polymerisation remains monomer-flooded as defined above. In practice this monomer-flooded condition is maintained by controlling the rate of monomer addition relative to the rate of initiation. If however a large proportion of the monomer mixture (say more than 40% by weight of the total monomers to be polymerised) is added to the reaction vessel before the start of polymerisation, then it will be appreciated that it is less important, through nevertheless desirable, that the subsequent monomer-feeding stage of the polymerisation is maintained in a monomer-flooded state because high molecular weight polymer will be produced during the initial stage of the polymerisation.

(B) In an especially preferred method, monomer-flooding is ensured for a substantial proportion of the polymerisation by performing a series of separate monomer introductions often of equal weight and composition (discontinuous monomer feeding). Thus, for example, the monomer mixture to be polymerised is divided into a number of equal portions (e.g. 4 to 10), one portion is added to the reaction vessel and polymerisation is commenced. this portion is then reacted to, say, greater than 90% conversion and a second portion of the monomer mixture is then added. This procedure is repeated until all the monomers have been introduced and polymerisation completed. This variant has the advantage of giving both high molecular weight and good colloid stability (i.e. low coagulum formation) and can be employed to give the desired modal molecular weight Mp of at least 200,000 at the usual commercially attractive polymerisation temperatures (e.g. 40° to 70° C.). This method has the additional advantage of allowing a good degree of control over the desired high molecular weight (Mp≧200,000) that is achieved; thus the use of a lower number (say 4 or 5) of larger volume portions will yield higher molecular weight than the use of a higher number (say 7 or more) of smaller volume portions.

It will be appreciated that the above two described techniques are only examples of how the polymerisation might be operated in a monomer-flooded condition, and that there are other possible detailed modifications of the procedure that could be employed to achieve the same objective.

Accordingly in a further aspect of the invention, a modal molecular weight Mp (as defined herein) of at least 200,000 for the vinylidene chloride copolymer used in the composition of the invention is achieved by employing a monomer-flooded polymerisation process (as defined herein) to prepare the copolymer.

Besides including at least one vinylidene chloride copolymer (as defined) and (usually) at least one external plasticiser, the composition of the present invention may also (and usually does) include at least one filler (extender) material, such as calcium carbonate (finely divided material is best), calcite particles, barite particles, clay particles, or silicate particles. This is desirable in order to lower the cost of the sealant composition, to provide "body", and sometimes to more finely tune the properties of the composition (such as rheology, slump resistance, hardness, flexibility, and weatherability). The use of calcium carbonate as the filler or extender material (or a blend of a calcium salt containing $Ca^{2+}$ ions, such as calcium carbonate or calcium chloride, with another extender such as a silicate) is particularly preferred in the compositions of the inventions since the resulting sealant compositions are believed to outperform the high performance acrylic aqueous-based sealant composition. The calcium carbonate particles are preferably untreated or substantially untreated (i.e. not surface-coated as are some commercially available grades or coated only to a very minor degree). The amount of said at least one filler (extender) material if used in the composition of the invention is usually usefully within the range of 100 to 500 weight % (more preferably 200 to 400 weight %, particularly 200 to 300 weight %) based on the weight of said at least one vinylidene chloride copolymer.

Other substances may also (optionally) be included (usually in small amounts) in the composition of the invention, e.g.

pigment(s), dye(s) or colourant(s); a common example of such a material is titanium dioxide (used as a whitener for example in many sealant compositions); sometimes a filler material may also function as a pigment (e.g. calcium carbonate as a whitening pigment as well as a filler);

surfactant(s) of one sort or another (i.e. in addition to surfactant used in an emulsion polymerisation to form the copolymer latex) which may be non-ionic or ionic in nature and may assist in achieving a uniform composition (paste) consistency; e.g. a non-ionic surfactant (such as one based on polyethylene oxide, or polyvinyl alcohol) helps to evenly disperse diverse components usually making up a sealant composition, and may also assist in maintaining good package stability; an anionic surface (such as sodium phosphate salt or a polyphosphate) may assist in facilitating a thorough and uniform dispersion of all filler(s) and pigment(s);

mineral spirit(s) (such as white spirit) which may retard skin formation and facilitate adequate time for tooling the sealant during application; it may also reduce the viscosity of the aqueous-based composition;

antifreeze(s) (such as ethylen glycol) to improve freeze/thaw stability (ethylene glycol may also act as a semipermanent plasticiser and may increase composition extrudability);

thickener(s);
rheology modifier(s)
biocide(s) (e.g. fungicide(s), algicide(s), and bacteriocide(s));
stabiliser(s);
cross-linking agent(s);
photosensitizer(s)
coalescing agent(s);
defoamers(s)
other polymer(s) (e.g. other free-radical addition polymer(s), including resinous or elastomeric addition polymer(s), or tackifying resin(s) which is usually a condensation polymer, often a phenolic resin);
silane (or other) adhesion promoters
other type(s) of material(s) required for any particular application.

The aqueous-based sealant composition of the composition is often in the form of a non-slumping fairly viscous paste, which renders it suitable for application by squeezing (extruding) from a container through a nozzle using, e.g. finger and/or gas pressure or a suitable gun arrangement (or the like). The solids content of the composition is usually in the range of from 75 to 85% by weight, since it is often desirable that shrinkage after application should not exceed about 25% while gunnability (extrusion) becomes increasingly difficult above about 85% solids content. The high solids also contributes to low slump, a desirable feature of sealants when applied to vertical joints or apertures.

The components of the composition of the invention may be formulated (mixed) using any suitable mixing arrangement or procedure. Usually, the best mixing equipment is a closed system, jacketed for cooling fluid (water) with planetary, Z or sigma blade mixing heads; this will usually provide thorough mixing with little or no loss of volatiles, little or no heat build-up, and excellent shear for a consistent homogeneous compound (paste). Mixing time, depending an equipment, can vary; often it is between about 1 to 3 hours. After adequate mixing (often comprising a main and a let down stage), a consistent, uniform aqueous-based sealant composition should result.

The sealant composition of the invention may be used to affectively seal apertures, cracks, gaps, joints, dimples or depressions (e.g. from nails or screws) or pathways in or between a variety of substrates. Such substrates include e.g. wood, various forms of panelling such as plyboard, particleboard, plasterboard, various plastics materials, various minerals (in suitable form) such as glass, asbestos, carbon fibre, concrete, plaster, and ceramics, and metals such as iron, steel and aluminium. After application, the sealant composition can if desired be appropriately contoured (smoothed) using a suitable tool (or even using a finger), and will then harden within a fairly short period (usually with 1 hour) by evaporation of water to become tack free, and (if desired) may be overpainted.

The present invention is illustrated by the following examples; the prefix C in an example denotes a comparative example; unless otherwise specified all parts, percentages, and ratios are on a weight basis.

In the examples, the performance of the sealant compositions is assessed by determining relevant mechanical properties and measuring adhesion/cohesion properties in tension.

For the determination of mechanical properties, sheets of hardened sealant were prepared with the assistance of aluminium frames of dimensions $100 \times 175 \times 3$ mm. Hardening time was 28 days under ambient conditions to ensure full hardening. Square-shouldered 5 cm dumbells were cut from the sheets and tested on an Instron tensile testing machine using a cross-head speed of 25 mm/min.

For the investigation of adhesion/cohesion in tension, aluminium/aluminium assemblies were prepared by sandwiching together $50 \times 50$ mm aluminium test plates with a 12 mm square sealant bead down the centre of each plate. After a hardening time of 28 days under ambient conditions, each assembly was tested to destruction using an Instron tensile testing machine set at a cross-head speed of 5 mm/min.

The key to the monomer notation used in the examples is as follows:
VDC: vinylidene chloride
BA: n-butyl acrylate
AA: acrylic acid Tg for a copolymer or copolymer composition was determined by differential scanning calorimetry.

The procedure for measurement of modal molecular weight Mp of the copolymer exemplified (as defined hereinbefore) involved dissolving 0.02g of polymer in 10 ml of H.P.L.C. grade tetrahydrofuran and after filtration through a 0.2 micron membrane injecting on to the gel permeation chromatograph at a solvent flow rate of 1ml/minute and a temperature of 40° C. The weight of polymer eluted from the chromatograph was measured using an Applied Chromatograph Services mass detector, and was plotted as a function of elution time.

EXAMPLES C1, C2, C3 and 4

Examples C1 and C2 were aqueous-based non-slumping sealant compositions derived from all-acrylic polymer latices available from the same commercial source and formulated in accordance with published formulations, C1 being plasticised and C2 being unplasticised. Example C3 was an aqueous-based sealant composition derived from an all-acrylic polymer latex available from a different commercial source and formulated in accordance with a published formulation, C3 also being unplasticised.

Example 4 (according to the invention) was a non-slumping aqueous-based sealant composition derived from an aqueous latex of a VDC/BA/AA (30/68/2) copolymer (solids content 56.1%) made by aqueous emulsion polymerisation using monomer flooded conditions (method B), the copolymer having Mp of 237894 and Tg of $-9°$ C. The sealant composition was prepared, using a mixer with Z blades (total mixing time about 2 hours), from the following formulation.

| | Parts |
|---|---|
| VDC/BA/AA copolymer latex (solids 56.1%) | 320.2 |
| Proxel CF (bacteriocide) | 0.1 |
| Triton X405 (non-ionic surfactant) | 6.7 |
| Ethylene glycol (antifreeze) | 1.9 |
| Natrasol MR (cellulosic thickener) | 1.9 |
| Calgon S (polyphosphate thickener) | 4.0 |
| Orotan 850 (surfactant) | 0.9 |
| Snowcal 70 (CaCO$_3$ particulate filler; not surface-coated) | 471.8 |
| Tioxide RCR2 (TiO$_2$ whitener) | 10.6 |
| Dioctyl phthalate (external plasticiser) | 105.7 |
| Let down | |
| VDC/BA/AA copolymer latex (solids 56.1%) | 56.5 |
| White spirit | 19.0 |
| Nopco NXZ (defoamer) | 0.7 |
| | 1000.0 |
| Weight solids | 81.4% |
| Volume solids | 71.6% |
| Filler: copolymer ratio | 2.2:1 |
| Copolymer: plasticiser ratio | 2:1 |
| Tack Free after | 15-30 mins |
| Shore A Hardness | 28 |
| British Standard Softness | 124 |

The composition had Tg of -64° C.

The mechanical properties of the sealant compositions of Examples C1, C2, C3 and 4 are summarized in the following Table 1.

The results of testing for adhesion/cohesion in tension are summarised in the following Table 2.

The advantageous combination of properties possessed by the aqueous-based sealant compositions of the present invention are readily apparent from the examples. Thus, Table 1 shows that the sealant from Example 4 (according to the invention) had distinctly improved maximum stress and breaking strain coupled with a reasonably low modulus (generally a fairly low modulus is desirable to impart flexibility: a very low modulus would give a putty-like material while a very high modulus might provide too brittle a sealant; usually such materials would not be required although they might be suitable for some applications). Table 2 shows that the sealant from Example 4 had distinctly improved adhesion/cohesion properties compared to the sealants from the comparative examples.

TABLE 1

| Composition of Ex. No. | Plasticised? | Modulus Nm$^{-2}$ | Max. Stress Ncm$^{-2}$ | Breaking Strain % |
|---|---|---|---|---|
| C1 | Yes | 112.0 | 32.1 | 138 |
| C2 | No | 152.0 | 51.8 | 134 |
| C3 | No | 230.3 | 67.1 | 103 |
| 4 | Yes | 109.7 | 86.3 | 569 |

TABLE 2

| | | Aluminium/Aluminium | |
|---|---|---|---|
| Composition of Ex. No. | Plasticised? | Extension % | Failure Type |
| C1 | Yes | 69 | AD |
| C2 | No | 42 | AD |
| C3 | No | 22 | AD |
| 4 | Yes | 338 | CO |

AD = Adhesive (failure by parting of sealant from test plate)
CO = Cohesive (failure by rupture in body of sealant)

EXAMPLES C5, C6, C7, 8 and 9

To show the effect of Mp in the compositions of the invention, non-slumping aqueous-based sealant compositions represented by Examples C5, C6, C7, 8 and 9 were prepared from aqueous latices of copolymers each having the same compositions as that used for Example 4 (i.e. VDC/BA/AA 30/68/2) but having Mp's varying from 64477 to 1214496 as shown in the following Tables 3 and 4 (which also show the copolymer Tg's). The copolymers of Examples 8 and 9 were prepared by a monomer-flooded polymerisation process (method B). The compositions were prepared using the same plasticised formulation as used for Example 4; all the compositions had Tg of well below 0° C.

The mechanical properties of the sealant compositions of examples C5, C6, C7, 8 and 9 are summarised in the following Table 3.

The results of testing for adhesion/cohesion in tension are summarised in the following Table 4.

The advantageous combinations of properties possessed by the aqueous-based sealant compositions having copolymers with Mp above 200,000 is readily apparent.

TABLE 3

| Composition of Ex. No. | Copolymer Properties Mp | Tg (°C.) | Modulus Ncm$^{-2}$ | Max. Stress Ncm$^{-2}$ | Breaking Strain % |
|---|---|---|---|---|---|
| C5 | 64477 | −11 | 36.4 | 17.6 | 275 |
| C6 | 98404 | −15 | 67.6 | 51.4 | 215 |
| C7 | 129631 | −13 | 64.4 | 42.4 | 362 |
| 8 | 545657 | −17 | 133.1 | 92.4 | 471 |
| 9 | 1214496 | −17 | 159.7 | 112.1 | 433 |

TABLE 4

| Composition Ex. No. | Copolymer Properties Mp | Tg (°C.) | Aluminium/Aluminium Extension % | Failure Type |
|---|---|---|---|---|
| C5 | 64477 | −11 | 154 | CO |
| C6 | 98404 | −15 | 126 | CO |
| C7 | 129631 | −13 | 253 | CO |
| 8 | 545657 | −17 | 387 | CO |
| 9 | 1214496 | −17 | 337 | CO |

CO = Cohesive (failure by rupture in body of sealant)

EXAMPLES 10 to 12

These sealant compositions, represented by Examples 10 to 12, illustrate (in conjunction with Example 4) the further advantage achieved by including polymerised units of a carboxylic acid in the compositions. The compositions of Examples 10 to 12 were prepared from aqueous latices of copolymers of general formula VDC/BA/AA with the specific compositions in Examples 10 to 12 being 28.8/71.2/0, 28.2/68.8/3.0, and 28.7/67.3/4.0 respectively. The copolymers had Mp's of 229351, 264097 and 205890 respectively and Tg's of −18, −16 and −15° C. respectively. The compositions were prepared using the same plasticised formulations containing untreated calcium carbonate filler as used for Example 4; the Tg's of the compositions were all well below 0° C. As mentioned previously, the copolymer used in the composition of Example 4 had the composition VDC/BA/AA 30/68/2, Mp of 237894 and Tg of −9° C. (Tg of composition −64° C.).

The mechanical properties of the sealant compositions of Examples 10 to 12 and Example 4 are summarised in Table 5. The results of testing for adhesion are summarized in Table 6.

It is seen that the compositions which include the carboxylic acid units yield much the stronger sealants (cf maximum stress figures), the sealant without acid units being mechanically rather weak. On the other hand, the latter's breaking strain is high which could be of use in some applications.

TABLE 5

| Composition of Ex. No. | Acid Level % | Modulus Ncm$^{-2}$ | Max. Stress Ncm$^{-2}$ | Breaking Strain % |
|---|---|---|---|---|
| 10 | 0 | 75.9 | 10.3 | 610 |
| 4 | 2 | 109.7 | 86.3 | 569 |
| 12 | 3 | 151.8 | 102.7 | 365 |
| 13 | 4 | 183.0 | 142.9 | 335 |

TABLE 6

| Composition Ex. No. | Acid Level % | Aluminium/Aluminium Extension % | Failure Type |
|---|---|---|---|
| 10 | 0 | 319 | CO |
| 4 | 2 | 338 | CO |
| 12 | 3 | 324 | CO |
| 13 | 4 | 356 | CO |

CO = Cohesive(failure by rupture in body of sealant)

We claim:

1. An aqueous-based sealant composition comprising:
   (A) at leat one vinylidene chloride copolymer which copolymer comprises polymerised units of vinylidene chloride and has a modal molecular weight Mp of at least 200,000; and
   (B) at least one filler material present in an amount of 100 to 500 weight % based on the weight of said at least one vinylidene chloride copolymer;
   and wherein said aqueous-based sealant composition (after drying) has a Tg below 0° C.

2. A sealant composition according to claim 1 wherein said copolymer had Mp within the range of from 200,000 to $5 \times 10^6$.

3. A sealant composition according to claim 1 or claim 2 wherein the Tg of said composition (after drying) is within the range from −75 to <0° C.

4. A sealant composition according to claim 1 wherein said composition includes at least one external plasticiser.

5. A sealant composition according to claim 4 wherein said at least one external plasticiser is selected from one or more C2 to C14 alkyl esters of phthalic acid.

6. A sealant composition according to either claim 4 or claims 5 wherein said at least one external plasticiser is present in an amount within the range from 1 to 150 weight % based on the weight of said at least one vinylidene chloride copolymer.

7. A sealant composition according to claim 1 wherein said filler material comprises particles of calcium carbonate, the surface of which particles is untreated.

8. A sealant composition according to claim 1 wherein said fillter material comprises a mixture of a calcium salt (containing Ca$^{2+}$ ions) and a different filler material.

9. A sealant composition according to claim 1 wherein said at least one vinylidene chloride copolymer itself has a Tg of ≦10° C.

10. A sealant composition according to claim 11 wherein said at least one vinylidene chloride copolymer itself has a Tg within the range of −40 to 10° C.

11. A sealant composition according to claim 1 wherein said at least one vinylidene chloride copolymer has been incorporated into said composition in the form of an aqueous latex of said copolymer.

12. A sealant composition according to claim 1 wherein said at least one vinylidene chloride copolymer in the composition contains 10 to 90 weight % of polymerised vinylidene chloride units.

13. A sealant composition according to claim 14 wherein the amount of polymerised vinylidene chloride units in said copolymer is 15 to 70 weight %.

14. A sealant composition according to claim 1 wherein said at least one vinylidene chloride copolymer in the composition comprises polymerised units of at least one internally plasticising comonomer.

15. A sealant composition according to claim 14 wherein the amount of polymerised units of said at least one internally plasticising comonomer in said copolymer is 10 to 90 weight %.

16. A sealant composition according to claim 14 wherein said at least one vinylidene chloride copolymer in the composition comprises 15 to 70 weight % of polymerised units of vinylidene chloride and 30 to 85 weight % of polymerised units of said at least one internally plasticising comonomer.

17. A sealant composition according to any one of claims 14 to 16 wherein said at least one internally plasticising comonomer is selected from n-butyl acrylate and 2-ethylhexyl acrylate.

18. A sealant composition according to claim 1 wherein said at least one vinylidene chloride copolymer in the composition comprises polymerised units of at least one alkyl acrylate or methacrylate having 1 to 12 carbon atoms in the alkyl groups.

19. A sealant composition according to claim 18 wherein said at least one alkyl acrylate or methacrylate provides at least part of any polymerised units of internally plasticising comonomer which are present in said copolymer.

20. A sealant composition according to claim 18 wherein the amount of said at least one alkyl acrylate or methacrylate in said copolymer is 10 to 90 weight %.

21. A sealant composition according to any one of claims 18 to 20 wherein said at least one vinylidene chloride copolymer in the composition comprises 15 to 70 weight % of polymerised units of vinylidene chloride, 30 to 85 weight % of polymerised units of at least one internally plasticising comonomer, and 30 to 85 weight % of polymerised units of at least one alkyl acrylate or methacrylate having 1 to 12 carbon atoms in the alkyl groups and optionally providing at least part of the units of said internally plasticising comonomer.

22. A sealant composition according to claim 1 wherein said at least vinylidene chloride copolymer contained in the composition comprises polymerised units of at least one ethylenically unsaturated acid.

23. A sealant composition according to claim 22 characterised in that said acid is an aliphatic alpha, beta-unsaturated carboxylic acid.

24. An sealant composition according to either claim 22 or claim 23 wherein the amount of said polymerised acid units in the copolymer is within the range of from 0.1 to 15 weight %.

25. A sealant composition according to claim 1 wherein said at least one vinylidene chloride copolymer contained in the composition comprises polymerised units of at least one multi-functional comonomer.

26. A sealant composition according to claim 1 wherein the amount of said at least one vinylidene chloride copolymer in said composition is within the range 10 to 50 weight %.

27. A sealant composition according to claim 1 wherein said vinylidene chloride has been prepared by polymerisation in aqueous emulsion using a monomer-flooded polymerisation process.

28. A sealant composition according to claim 1 wherein said composition is in the form of a non-slumping paste.

29. A sealant composition according to claim 1 wherein said composition has a solids content within the range of from 75 to 85% by weight.

30. A process of sealing which comprises applying the aqueous-based sealant composition according to claim 1 to the area to be sealed, and allowing the thus applied aqueous-based sealant composition to harden.

* * * * *